E. G. DANN.
LEAF SPRING.
APPLICATION FILED AUG. 31, 1914.

1,221,695.

Patented Apr. 3, 1917.

WITNESSES:
H. M. Gillespie
J. B. Lagorio, Jr.

INVENTOR.
Ernest G. Dann
BY Barnett Truman
ATTORNEYS

UNITED STATES PATENT OFFICE.

ERNEST G. DANN, OF CHICAGO, ILLINOIS.

LEAF-SPRING.

1,221,695.  Specification of Letters Patent.  Patented Apr. 3, 1917.

Application filed August 31, 1914. Serial No. 859,472.

*To all whom it may concern:*

Be it known that I, ERNEST G. DANN, a citizen of the United States, residing at Chicago, in the county of Cook and State of Illinois, have invented certain new and useful Improvements in Leaf-Springs, of which the following is a specification.

My invention relates to leaf springs, either elliptical or semi-elliptical, such, for example, as are commonly employed for supporting vehicle bodies on their running gear, and the object of the invention is to increase the durability of such springs, and to insure a high degree of resiliency, by preventing the corrosion of the bearing surfaces of the superposed leaves.

In a compound leaf spring it is, of course, intended that the superposed leaves should have a certain amount of relative movement one upon the other, and such movement is, in fact, essential if the spring is to have any considerable degree of resiliency. The relative movement between the leaves is much hindered by the corrosion of the bearing surfaces due to moisture. Water is likely to work in between the leaves of a spring. Even the moisture of the air will bring about a certain amount of corrosion. Any roughening of the surfaces in contact, whether from this cause or another, by checking the freedom of movement of one leaf upon the other detracts from the resiliency of the spring as a whole. It has been customary, in order to overcome the stiffness of compound leaf springs and add to their life, to occasionally take the springs apart and lubricate their bearing surfaces. This is an expedient which is obviously only temporarily effective. The lubricant soon works out under the continual pressure and movement of one leaf upon the other. Another expedient is to insert lubricant carrier strips between the leaves of a spring.

My present invention contemplates a different method of procedure for accomplishing the same result with more permanent effect at considerably less expense. The invention provides for covering the bearing surfaces of the leaves of a steel compound leaf spring with a non-corrosible metallic film or facing which is permanently united with the steel of the spring by being in part incorporated in the superficial portions of the leaves. The metal used is preferably of a soft amorphous character, such as lead, bronze, white metal, or alloys of these or similar metals, so that the bearing surfaces provided are not only unaffected by the weather but are smoother and develop less friction than would steel surfaces even if no corrosion took place. The facings have, in effect, a lubricating function, the distinction being that while the ordinary lubricant, if applied to the leaves of a compound spring, will soon work out leaving the steel exposed to corrosion, the lubricating faces of my invention form structurally a part of the steel and will be relatively permanent. That is, they will last until actually worn away by attrition. The provision of the springs with these non-corrosible lubricating faces besides increasing the resiliency of the springs adds to their life as springs are necessarily weakened by the corrosion of the leaves. Moreover, a stiff spring is much more likely to break than one which is resilient.

The invention is illustrated in a diagrammatic way in the accompanying drawing in which—

Like characters of reference designate like parts in the several figures of the drawings.

In carrying out the invention the upper surface of the master leaf A is provided with a non-corrosive lubricating facing B preferably a trifle longer than the superposed leaf C. The portion of the upper surface of the leaf C, on which leaf D bears, is similarly treated. The under surface of C is also preferably provided with the facing of my invention. This is desirable but not essential as it will be possible to obtain some of the advantages of my invention by treating only one of each pair of contacting faces.

Figure 1:
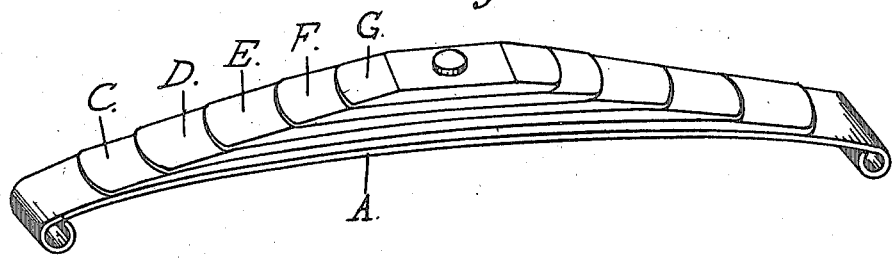
Figure 1 is a view, in perspective, of a semi-elliptical compound spring of the sort suitable for being treated as provided by my invention.
Figure 2:
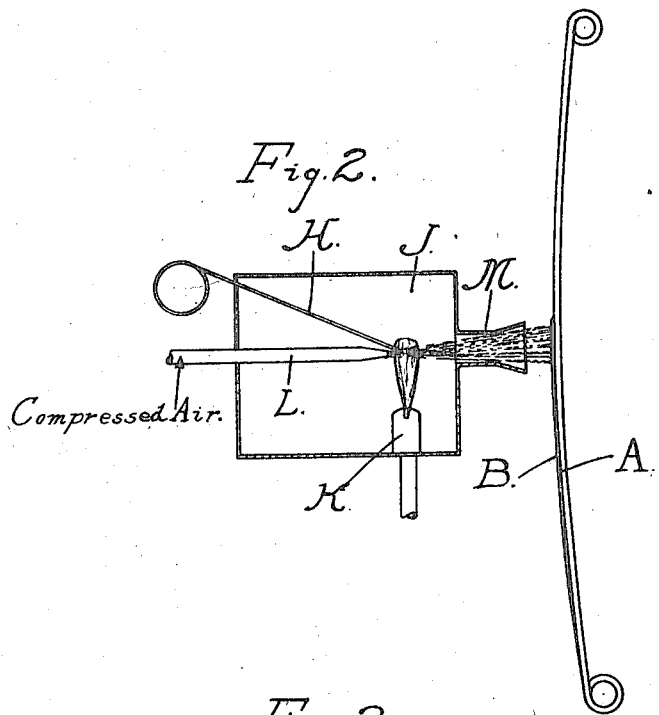
Fig. 2 is a view, illustrating a preferred method of applying the facings to the springs.
Figure 3:
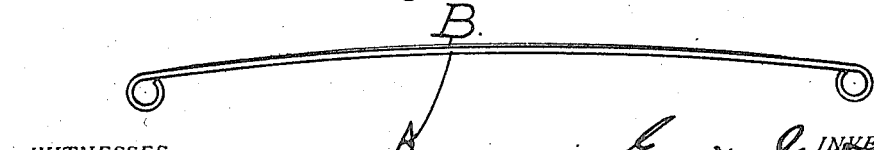
Fig. 3 is an edge view of one of the leaves of the spring showing the facing applied thereto.

The other leaves D, E, F and G are provided with facings of the same character. These facings are preferably produced in the manner diagrammatically shown in Fig. 2. H represents a strip or wire of the metal to be used for making the facing, lead, bronze, white metal, copper, or other similar metal, or alloys thereof, which is fed into chamber J so as to be melted by a gas flame K, or other source of heat. A jet of compressed air from pipe L carries the molten metal through the spout M against the spring being treated. By this process the facing metal is integrally united in a very permanent manner with the superficial portions of the steel composing the spring being treated. The facing metal, in fact, penetrates to a certain distance into the structure of the steel. The operation is very different from one of plating. The ordinary plating methods will not produce a covering for the leaves which will be permanent. A plating will very soon crack off with the constant vibration, attrition and flexure of the leaves. It is the integral, structurally unified relation between the facing and the steel of the spring which is produced when the facing is made as above described, which gives said facing its utility for the purpose intended.

I claim:

1. A compound leaf spring composed of superposed leaves having their surfaces of contact one with another provided with facings of non-corrosive metal integrally united with the metal composing the leaves.

2. A compound leaf spring composed of superposed leaves having their surfaces of contact one with another provided with facings of non-corrosive metal integrally united with the metal composing the leaves by being forced against the leaves while in molten condition.

3. A compound leaf spring composed of superposed steel leaves having their surfaces of contact one with another provided with facings of a metal softer than steel and of a lubricating character integrally united with the steel composing the leaves.

4. A compound leaf spring composed of superposed steel leaves having their surfaces of contact provided with integral facings of non-corrosive metal of a lubricating character.

5. A laminated structure comprising laminæ of yieldable material and a surface of lubricating material interposed between each contacting pair of laminæ and integrally united with one of them.

6. A laminated structure comprising laminæ of yieldable material and a surface of lubricating material interposed between each contacting pair of laminæ and inseparably united with one of them.

7. A laminated structure comprising laminæ of yieldable material and a surface of lubricating material interposed between each contacting pair of laminæ and inseparably united with one of them by adhesion only.

ERNEST G. DANN.

Witnesses:
  L. A. FALKENBERG,
  R. KUEHN.